US009432348B2

(12) United States Patent
Ignatchenko et al.

(10) Patent No.: US 9,432,348 B2
(45) Date of Patent: Aug. 30, 2016

(54) SECURE ZONE FOR SECURE PURCHASES

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 111 days.

(21) Appl. No.: 13/866,687

(22) Filed: Apr. 19, 2013

(65) Prior Publication Data
US 2013/0283353 A1 Oct. 24, 2013

Related U.S. Application Data

(60) Provisional application No. 61/636,201, filed on Apr. 20, 2012.

(51) Int. Cl.
H04L 29/06 (2006.01)
G06F 21/53 (2013.01)
G06F 21/51 (2013.01)
G06F 21/54 (2013.01)

(52) U.S. Cl.
CPC ............ H04L 63/08 (2013.01); G06F 21/51 (2013.01); G06F 21/53 (2013.01); G06F 21/54 (2013.01)

(58) Field of Classification Search
CPC ..... H04L 63/08; H04L 63/10; H04L 63/101; H04W 12/08; G06F 21/31
See application file for complete search history.

(56) References Cited

U.S. PATENT DOCUMENTS

| 5,134,700 | A | 7/1992 | Eyer et al. |
| 5,500,897 | A | 3/1996 | Hartman, Jr. |
| 5,615,263 | A | 3/1997 | Takahashi |
| 5,677,955 | A | 10/1997 | Doggett et al. |
| 5,787,172 | A | 7/1998 | Arnold |
| 5,815,571 | A | 9/1998 | Finley |

(Continued)

FOREIGN PATENT DOCUMENTS

| CA | EP 2045753 A1 * | 4/2009 | ............. G06F 21/51 |
| EP | 1 612 670 A2 | 1/2006 | |

(Continued)

OTHER PUBLICATIONS sUH et al., "AEGIS: Architecture for TamperEvident and Tamper-Resistant Processing", 2003.*

(Continued)

Primary Examiner — Yonas Bayou
(74) Attorney, Agent, or Firm — Arnold & Porter LLP

(57) ABSTRACT

An apparatus according to the present disclosure may comprise a secure zone configured to execute a task having a subtask. The task and subtask may have respective executable code and may be digitally signed by respective code providers. The secure zone may be further configured to apply respective sets of permissions while the respective executable code of the task and subtask are executed. The respective set of permissions for the task may be based on at least one of information associated with the signed task and information in a digital certificate of the respective code provider for the task. The respective set of permissions for the subtask may be based on at least one of information associated with the signed subtask and information in a digital certificate of the respective code provider for the subtask.

21 Claims, 6 Drawing Sheets

(56) References Cited

U.S. PATENT DOCUMENTS

| | | | |
|---|---|---|---|
| 5,832,206 A | 11/1998 | De Jesus et al. | |
| 5,896,499 A | 4/1999 | McKelvey | |
| 5,978,484 A * | 11/1999 | Apperson | G06F 21/125 |
| | | | 705/54 |
| 6,088,684 A | 7/2000 | Custy et al. | |
| 6,092,202 A | 7/2000 | Veil et al. | |
| 6,385,727 B1 | 5/2002 | Cassagnol et al. | |
| 6,581,841 B1 | 6/2003 | Christoffersen | |
| 6,862,641 B1 | 3/2005 | Strongin et al. | |
| 7,065,654 B1 | 6/2006 | Gulick et al. | |
| 7,337,314 B2 | 2/2008 | Hussain et al. | |
| 7,350,194 B1 | 3/2008 | Alpern | |
| 7,363,493 B2 * | 4/2008 | Dotan | G06F 21/52 |
| | | | 713/167 |
| 7,574,479 B2 | 8/2009 | Morris et al. | |
| 7,587,611 B2 | 9/2009 | Johnson et al. | |
| 7,636,858 B2 | 12/2009 | Khan et al. | |
| 7,681,046 B1 | 3/2010 | Morgan et al. | |
| 7,774,619 B2 | 8/2010 | Paaske et al. | |
| 7,779,252 B2 | 8/2010 | O'Brien et al. | |
| 7,797,544 B2 | 9/2010 | Dillaway et al. | |
| 7,853,531 B2 | 12/2010 | Lao et al. | |
| 7,861,097 B2 | 12/2010 | Smeets et al. | |
| 7,882,221 B2 | 2/2011 | Sailer et al. | |
| 7,940,932 B2 | 5/2011 | Paksoy et al. | |
| 7,979,696 B2 | 7/2011 | Kim et al. | |
| 8,112,787 B2 | 2/2012 | Buer | |
| 8,656,482 B1 | 2/2014 | Tosa et al. | |
| 8,949,929 B2 | 2/2015 | Kelly et al. | |
| 8,959,183 B2 * | 2/2015 | Zeller | G06F 9/44521 |
| | | | 709/219 |
| 2002/0062438 A1 | 5/2002 | Asay et al. | |
| 2002/0183056 A1 * | 12/2002 | Lundblade | G06F 8/61 |
| | | | 455/425 |
| 2003/0051169 A1 * | 3/2003 | Sprigg | G06F 9/468 |
| | | | 726/4 |
| 2004/0010565 A1 | 1/2004 | Hong et al. | |
| 2005/0268103 A1 | 12/2005 | Camenisch | |
| 2006/0010447 A1 * | 1/2006 | Egashira | G06F 9/4843 |
| | | | 718/100 |
| 2006/0047959 A1 * | 3/2006 | Morais | G06F 21/53 |
| | | | 713/166 |
| 2006/0101408 A1 * | 5/2006 | Kotamarthi | G06F 21/52 |
| | | | 717/126 |
| 2006/0117177 A1 | 6/2006 | Buer | |
| 2006/0259790 A1 | 11/2006 | Asokan et al. | |
| 2008/0155540 A1 * | 6/2008 | Mock | G06Q 10/06 |
| | | | 718/100 |
| 2008/0270786 A1 | 10/2008 | Brickell et al. | |
| 2008/0316357 A1 | 12/2008 | Achari et al. | |
| 2009/0072032 A1 | 3/2009 | Cardone et al. | |
| 2009/0172329 A1 | 7/2009 | Paver et al. | |
| 2009/0172411 A1 | 7/2009 | Kershaw et al. | |
| 2009/0210705 A1 | 8/2009 | Chen | |
| 2009/0254986 A1 | 10/2009 | Harris et al. | |
| 2009/0271618 A1 | 10/2009 | Camenisch et al. | |
| 2009/0300263 A1 | 12/2009 | Devine et al. | |
| 2009/0300348 A1 | 12/2009 | Aciicmez et al. | |
| 2010/0031047 A1 | 2/2010 | Coker, II et al. | |
| 2010/0145854 A1 | 6/2010 | Messerges et al. | |
| 2010/0192230 A1 | 7/2010 | Steeves et al. | |
| 2011/0029771 A1 | 2/2011 | Mehta et al. | |
| 2011/0087887 A1 | 4/2011 | Luft et al. | |
| 2012/0240194 A1 * | 9/2012 | Nack Ngue | G06F 21/604 |
| | | | 726/4 |
| 2013/0055347 A1 * | 2/2013 | Chawla | H04W 12/08 |
| | | | 726/3 |
| 2013/0232339 A1 | 9/2013 | Ignatchenko et al. | |
| 2013/0238786 A1 | 9/2013 | Khesin | |
| 2013/0262891 A1 * | 10/2013 | Gudlavenkatasiva | G06F 1/3212 |
| | | | 713/320 |
| 2013/0275306 A1 | 10/2013 | Ignatchenko et al. | |
| 2013/0276064 A1 | 10/2013 | Ignatchenko et al. | |
| 2013/0283353 A1 | 10/2013 | Ignatchenko et al. | |
| 2013/0339742 A1 | 12/2013 | Ignatchenko et al. | |
| 2013/0346747 A1 | 12/2013 | Ignatchenko et al. | |
| 2013/0346760 A1 | 12/2013 | Ignatchenko | |
| 2014/0096182 A1 | 4/2014 | Smith | |
| 2014/0143538 A1 | 5/2014 | Lindteigen | |
| 2014/0196127 A1 | 7/2014 | Smeets et al. | |
| 2014/0279562 A1 | 9/2014 | Ignatchenko et al. | |
| 2014/0281500 A1 | 9/2014 | Ignatchenko | |
| 2014/0281587 A1 | 9/2014 | Ignatchenko | |

FOREIGN PATENT DOCUMENTS

| | | |
|---|---|---|
| EP | 2 045 753 A1 | 4/2009 |
| EP | 2045753 A1 * | 4/2009 |
| EP | 2 107 486 A2 | 10/2009 |
| EP | 2 113 855 A1 | 11/2009 |
| EP | 2 278 514 A1 | 1/2011 |
| WO | 01/17296 A1 | 3/2001 |
| WO | 2009/071734 A1 | 6/2009 |
| WO | 2009/111409 A1 | 9/2009 |
| WO | 2011/037665 A2 | 3/2011 |
| WO | 2012/014231 A1 | 2/2012 |

OTHER PUBLICATIONS

Alsouri et al., "Group-Based Attestation: Enhancing Privacy and Management in Remote Attestation," *Trust and Trustworthy Computing*, 63-77 (Jun. 2010).

Anderson et al. "Cryptographic Processors—A survey", *Technical Report*, No. 641, University of Cambridge Computer Laboratory (Aug. 2005) (http://www.cl.cam.ac.uk/techreports/UCAM-CL-TR-641.pdf).

Annonymous, "TrustZone System Security by ARM the Architecture for the Digital World," retrieved from the Internet at http://www.arm.com/products/processors/technologies/trustzone/index.php (2014).

Chen et al., "A New Direct Anonymous Attestation Scheme from Bilinear Maps," *2008. ICYCS 2008. The 9th International Conference for Young Computer Scientists*, 2308-2313 (2008).

Garfinkel, "Terra: a virtual machine-based platform for trusted computer," *ACM SOSP. Proceedings of the ACM Symposium on Operating Systems Principles*, 193-206 (2003).

Guo et al., "A New DAA Scheme From One-off Public Key," *Electronics, Communications and Control (ICECC), 2011 International Conference*, 646-649 (Sep. 2011).

International Search Report and Written Opinion issued in PCT/IB2013/000680 on Sep. 5, 2013.

International Search Report and Written Opinion issued in PCT/IB2013/000672, dated Jul. 23, 2013.

International Search Report issued in PCT/IB2013/000741 on Dec. 12, 2013.

International Search Report and Written Opinion issued in PCT/IB2014/059638 on Jul. 3, 2014.

International Search Report and Written Opinion issued in PCT/IB2014/059839 on Aug. 7, 2014.

International Search Report and Written Opinion issued in PCT/IB2014/059845 on Aug. 8, 2014.

Liu et al., "A Remote Anonymous Attestation Protocol in Trusted Computing," *Parallel and Distributed Processing, 2008. IPDPS 2008, IEEE International Symposium*, 1-6 (2008).

Manulis et al., "UPBA: User-Authenticated Property-Based Attestation," *Privacy, Security and Trust (PST), 2011 Ninth Annual International Conference*, 112-119 (2011).

Suh et al., "AEGIS: Architecture for Tamper-Evident and Tamper-Resistant Processing," Computation Structures Group Memo 461, CSAIL Computer Science and Artificial Intelligence Laboratory, Massachusetts Institute of Technology (Feb. 2003).

Sun et al., "A Strict Inter-Domain Anonymity Attestation Scheme," *Computer Design and Applications (ICCDA), 2010 International Conference*, V3-291-V3-295 (2010).

Tanveer et al., "Scalable Remote Attestation with Privacy Protection (Work in Progress)," *Trusted Systems*, 73-87 (Dec. 2009).

(56) References Cited

OTHER PUBLICATIONS

Yu et al., "An anonymous property-based attestation protocol from bilinear maps," *Computational Science and Engineering, 2009. CSE '09, International Conference*, 2:732-738 (2009).

Yu et al., "Real-Time Remote Attestation with Privacy Protection," *Trust Privacy and Security in Digital Business*, 81-92 (Aug. 2010).

Zhang et al., "Improving Privacy of Property-based Attestation without a Trusted Third Party," *Computational Intelligence and Security (CIS), 2011 Seventh International Conference on Computational Intelligence and Security*, 559-563 (2011).

Bare, "Attestation and Trusted Computing," CSEP 590: Practical Aspects of Modern Crptography, pp. 1-9 (2006) <https://courses.cs.washington.edu/courses/csep590/06wi/finalprojects/bare.pdf>.

Berger et al., "vTPM: Virtualizing the Trusted Platform Module," Security '06: $15^{th}$ USENIX Security Symposium, USENIX Association, pp. 305-320 (2006).

International Search Report and Written Opinion mailed Nov. 18, 2014, as received in International Application No. PCT/IB2014/063637.

Stumpf et al., "Improving the Scalability of Platform Attestation," Proceedings of the $3^{rd}$ ACM Workshop on Scalable trusted computing, ACM, pp. 1-10 (2008).

\* cited by examiner

SECURE ZONE FOR SECURE PURCHASES

RELATED APPLICATIONS

This application claims priority to U.S. Provisional Application No. 61/636,201, filed Apr. 20, 2012, entitled "Secure Zone for Secure Purchases," the content of which is incorporated herein by reference in its entirety.

FIELD OF THE DISCLOSURE

The systems, methods and apparatuses described herein relate to the security of computer network-based commercial and other sensitive data transactions.

BACKGROUND

Internet shopping, online banking, and other network-based forms of transmitting sensitive data are highly popular, but may be susceptible to a variety of security breaches resulting from computer viruses, backdoors, keyloggers and other forms of attacks on the user's computer or other device. These attacks generally relate to vulnerabilities in the operating system of the device used to access the network. What is needed is a suitable hardware platform to implement security solutions which are not susceptible to software-based attacks.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses for securely performing computer-based actions or transactions. For example, it might be desirable to use a computer to establish a secure connection with a remote server, such as an SSL connection, for the purposes of viewing bank account transactions or to purchase certain products or services. In another example, it might be desirable for an appropriately-equipped television to receive encrypted media content from an Internet store. In each case, a skilled individual could intercept the data within an operating system running the computer—e.g., a credit card number sent via the SSL connection, or a movie transferred from the Internet store—by, for example, installing malware (such as a virus, a keylogger or a Trojan horse) into the operating system of the user's computer. The inventions described herein provide a way to transfer certain activities to a secure zone, which cannot be compromised even if the operating system is under complete control of the attacker, so as to ensure that these computer-based activities truly remain secure from attack. In addition, for additional security, the secure zone may be made tamper-resistant and/or may use tamper detection techniques, with, for example, erasure of one or more cryptographic keys upon tamper detection.

Figure 1:
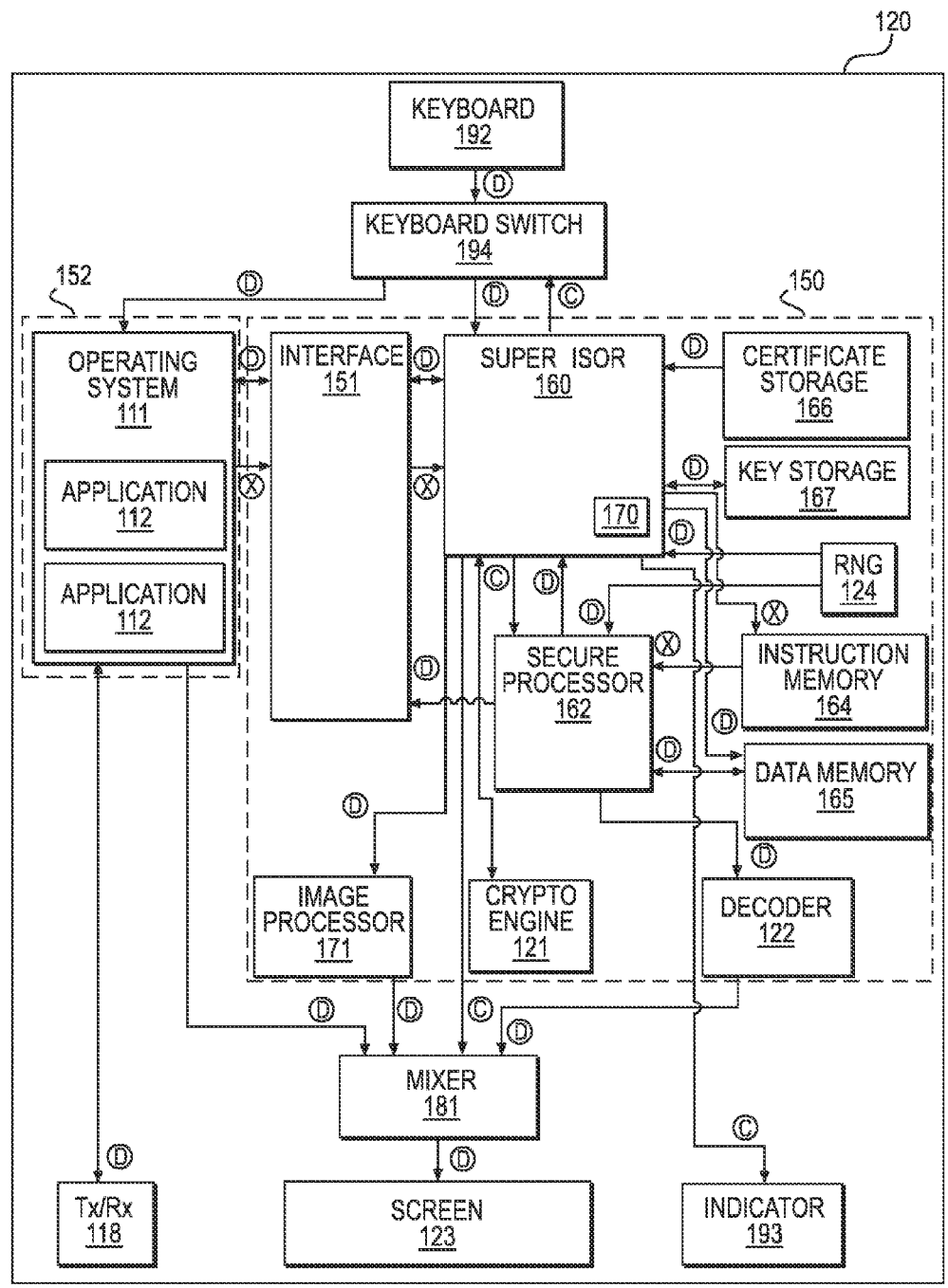
FIG. 1 is a block diagram of an exemplary system according to the present disclosure.

FIG. 1 shows one example by which a secure zone 150 according to the present disclosure may be implemented in a larger device 120, such as a computer, laptop, smart phone, television set, personal music player, set-top box, etc.

A secure zone 150 according to the present disclosure may first comprise an interface 151 to one or more non-secure zones 152. The term "non-secure zone," as used herein, refers to any device, processor, operating system, or other object, or combination thereof, which is capable of providing messages, codes, tasks or other information to a secure zone 150. The interface 151 may be configured to receive these messages, codes or tasks from those non-secure zones 152. For example, if a secure zone 150 is implemented in a laptop, the interface 151 may be implemented as some kind of bus (for example, a PCIe bus) and may be configured to receive messages, code, tasks or other information from the laptop's central processing unit. If the secure zone 150 were implemented in a television, the interface 151 again might be implemented, for example, as some kind of bus (for example, an I²C bus), and configured to receive information from a separate set-top box or from the microcontroller unit of the television.

A secure zone 150 may further comprise a supervisor 160 coupled to the interface 151. The supervisor 160 may be used to control access to the components of the secure zone 150, and may be used to enforce certain operational rules of the secure zone 150, providing certain security guarantees to the end-user. For example, in one embodiment, the supervisor 160 may be able to: (1) receive executable code which can be run on one or more secure processors 162 within the secure zone 150 via the interface 151; (2) check that certain requirements (as described in greater detail below) are fulfilled for this code; (3) if requirements are fulfilled, load this code into one or more instruction memories 164 located within the secure zone 150; (4) clear and/or pre-fill one or more data memories 165 located within the secure zone 150; (5) instruct the secure processor 162 to execute code loaded into the instruction memory 164; (6) control one or more indicators 193, which may be used to signal to a user certain security modes of the computing device 120; (7) control one or more peripherals within the computing device 120; (8) provide visual feedback to the end-user about the origin of the loaded code; and (9) clean up (to the extent required) after the code has been executed. Each of these functions are described in greater detail herein. In one embodiment, the supervisor 160 may further comprise a temporary storage 170 (for example, implemented as RAM or flash memory). In one embodiment, the supervisor 160 may be implemented in hardware within the secure zone 151, such that the supervisor 160 cannot be affected or modified.

As noted previously, the secure zone 150 also may comprise a secure processor 162, which may be configured to execute code loaded into the instruction memory 164 and to exchange data with the interface 151. The secure processor 162 may be a general purpose processor or any suitable form of special purpose processor. In some embodiments, the secure processor 162 may be implemented as a hardware separate from the supervisor 160; in some other embodiments, the supervisor 160 and the secure processor 162 could be implemented using the same hardware, as long as the functional requirements specified below are observed. In addition, it will be understood that while FIG. 1 shows the secure processor 162 as having a so-called "Harvard architecture" (with separate instruction memory 164 and data memory 165), other architectures (like the ubiquitous von Neumann architecture) may be used as long as equivalent instruction and data restrictions are enforced by the supervisor 160 (for example, the XN bit may be used in ARM® processors to provide some separation of data memory from instruction memory, as long as the XN bit in appropriate memory areas is enforced by the supervisor 160 and cannot be altered by loadable code running on the secure processor 162).

In certain embodiments, the secure zone 150 may further comprise one or more cryptographic engines 121. These cryptographic engines 121 may be configured to implement one or more cryptographic algorithms, such as AES or RSA. The cryptographic engine 121 may receive data from the supervisor 160 for encryption or decryption, and may provide the resulting ciphertext (or plaintext, as appropriate) back to the supervisor 160. In some embodiments, the cryptographic engine 121 also may be used by the secure processor 162; in this case, it may be desirable to have a clear separation between any cryptography-related tasks coming from the supervisor 160 to the crypto engine 121 and any cryptography-related tasks coming from the secure processor 162 to the crypto engine 121, so as to avoid any leaks of information associated with one component to the other. The secure zone 150 may also comprise a random number generator 124 to provide support to cryptographic processes.

In other embodiments, the supervisor 160 may be configured to perform some or all of the functionality of the cryptographic engine 121, and a separate cryptographic engine 121 may not be required.

If the secure zone 150 is expected to perform image and/or video processing, it may further comprise a decoder 122. For example, if the secure zone 150 receives encrypted media content from the non-secure zone 152 (such as from a video player application 112 running within the operating system 111), the code running on secure processor 162 (with or without the help of the cryptographic engine 121, depending on the embodiment) might be responsible for decrypting the content, and then the decoder 122 may be responsible for decoding the content. This decoder 122 may comprise, for example, implementations of algorithms such as H.264, VC-1, PNG, JPEG, etc. In some cases, the decoder 122 may also include certain text rendering capabilities.

In some embodiments, the decoder 122 may be implemented in hardware (for example, as a specialized DSP processor). As shown on FIG. 1, the decoder 122 may be coupled to the secure processor 162, such that decrypted data may pass from the cryptographic engine 121 to the decoder 122.

In some other embodiments, the secure processor 162 may be configured to perform some or all of the functionality of the decoder 122, and a separate decoder may not be required. In still other embodiments, the secure zone 150 may not provide native support for image and/or video decoding, but may be able to receive and execute code (on the secure processor 162) designed to implement this type of media content processing.

As noted previously, the secure zone 150 may further comprise one or more instruction memories 164 and data memories 165, which may be implemented as some kind of volatile memory, such as, for example, RAM. The absence of persistent writable storage for executable code may ensure that no viruses, back-doors, or other malicious code can be installed within the secure zone 150. In addition, the secure zone 150 may contain one or more dedicated certificate storages 166, which may be implemented as read-only non-volatile memory, and one or more dedicated key storages 167, which may be implemented as non-volatile memory. Key storage 167 may be used, for example, for the storage of one or more private keys (which can be generated, for example, by supervisor 160 using RNG 124), one or more corresponding public key(s) or associated digital certificates, and/or a unique device identifier. This information may be used to identify and/or authenticate the computer-based device 120 within which the secure zone 150 is located.

As noted previously, a secure zone 150 is meant to be used within the context of a larger computer-based device 120, such as a television or a laptop. Thus, it will be understood that the computer-based device 120 may comprise a number of components which are outside the secure zone 150, but may nonetheless assist in the operation of the secure zone 150. For example, the device 120 may comprise traditional input/output devices such as a keyboard 192 or a screen 123; in other embodiments, the device 120 may further comprise other I/O devices (such as a mouse, remote control transceivers, speakers, or cameras). These I/O devices may be beneficial to the operation of the secure zone 150 when, for example, a user desires to enter secure data (for example, a card PIN) without the risk of the operating system 111 eavesdropping or modifying it. The device 120 may further comprise a communications port 118, enabling the device to communicate with other devices. In the foregoing example, the communications port 118 may be useful in creating a connection between the device 120 and a remote computer over a network connection. Also, such a computer-based device 120 may run an operating system 111 and one or more applications 112.

Finally, as shown on FIG. 1, the device 120 also may comprise a means for indicating when the device 120 is operating in a secure mode, shown on FIG. 1 as "indicator" 193. Such an indicator 193 may be, for example, a green LED which is placed on an outside case of the device 120 and readily visible to a user. If the LED is on, the device 120 may be operating in a secure mode (more specifically, in "partial-screen secure mode" as described below).

As a result, a device 120 according to the present disclosure may further comprise additional hardware allowing it to take control of these peripheral components of the device 120 from, e.g., the operating system 111. For example, the secure device 120 may comprise a mixer 181, allowing the secure zone 150 to control the screen 123. The device 120 might also comprise a keyboard switch 194, allowing the secure zone 150 to control the keyboard 192. In this manner, the same input/output devices (e.g., the keyboard 192 and screen 123) may be used to support both non-secure and secure zones. It shall be understood that while FIG. 1 shows components like the mixer 181 and the keyboard switch 194 as implemented outside of the secure zone 150, in some embodiments these components may be placed within the secure zone 150.

Finally, the secure zone 150 may be optionally physically secured, such that it is tamper-resistant. The secure zone 150 may also (alternatively, or in addition to being tamper-resistant) incorporate one or more tamper detection techniques. For example, several tamper-resistant methods for protecting cryptographic processors are already known and have been described in the art; see http://www.cl.cam.ac.uk/techreports/UCAM-CL-TR-641.pdf. In some embodiments, it may be desirable, for instance, to manufacture the secure zone 150 within a single chip. In another embodiment, the secure zone 150 might have a secure enclosure. In some of these embodiments, the secure zone 150 may be configured to execute one or more possible responses if it detects that the chip's integrity has been compromised, and/or if it detects penetration of the secure enclosure. These responses may vary from erasing any stored encryption key(s) within the key storage 167 to the physical destruction of all or part of the secure zone 150.

Figure 2:
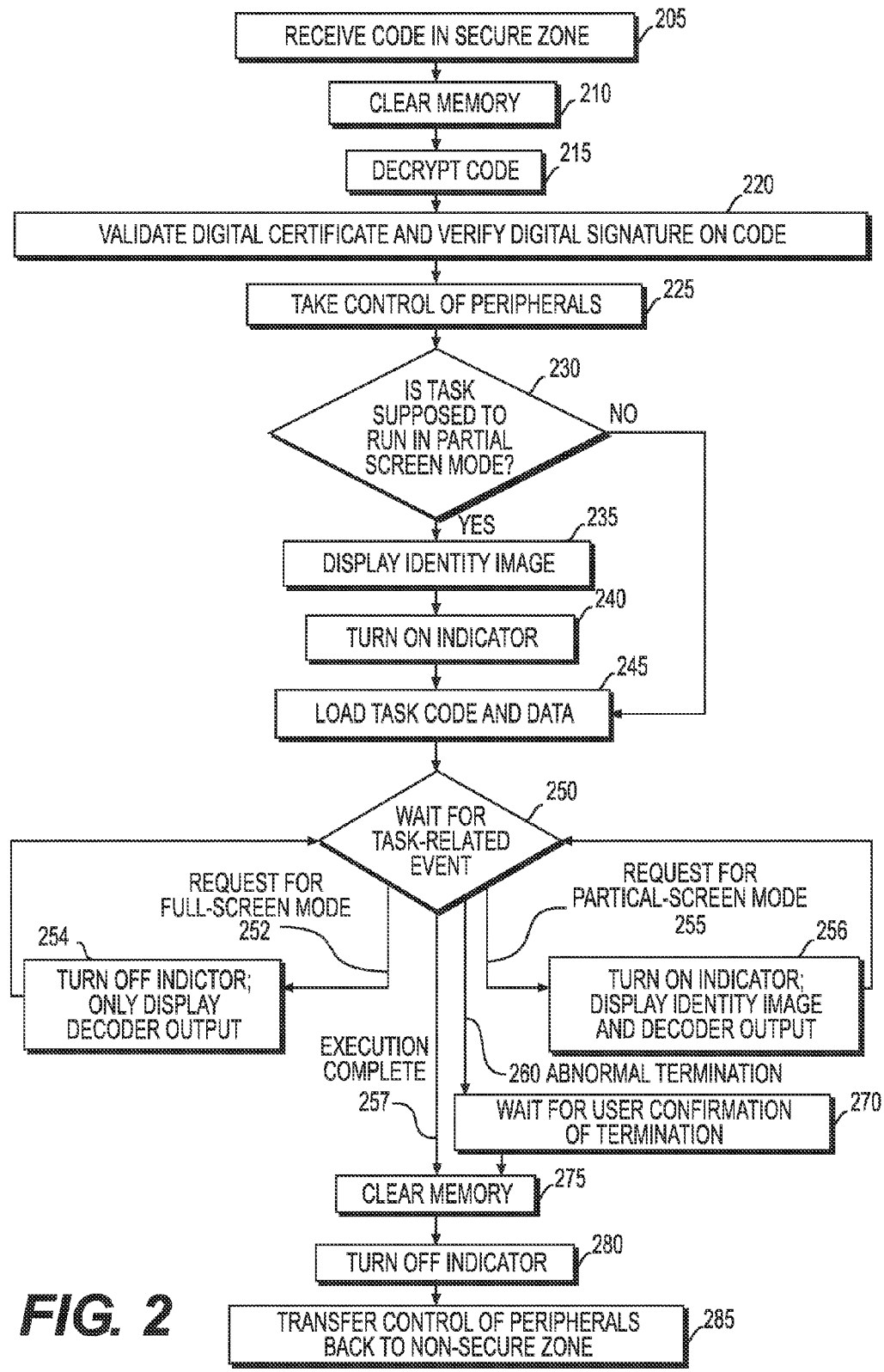
FIG. 2 is a flow diagram illustrating an exemplary method by which a system according to the current disclosure may accept a task for execution; organize the process of task execution; and cleanup after task execution.

FIG. 2 shows an exemplary method by which a secure zone 150 according to the present disclosure may accept a task for execution; organize the process of task execution; and cleanup after task execution.

At step 205, the interface 151 may receive the code from the non-secure zone 152, and may pass this code to the supervisor 160 for execution by the secure processor 162. It should be understood that whenever code is transferred at step 205, the code may additionally include related application data.

At step 210, prior to executing any received code, the supervisor 160 may clear all data stored within the instruction memory 164 and data memory 165. For example, the supervisor 160 might zero all of the instruction memory 164 and data memory 165. This may be performed to prevent old code, data, or both, from affecting the code currently being loaded, and to avoid information leaks between different pieces of code.

In some embodiments, the code provider may have encrypted the code (and any related application data) before sending it to the secure zone 150. For example, the code provider may have used a public key corresponding to a private key of the supervisor 160 (which may previously have been stored in the key storage 167, and which may be used by the supervisor 160 to decrypt the code) to encrypt the code. Thus, at step 215, if the code has been encrypted using a public key of the supervisor 160, the supervisor 160 may extract a copy of the corresponding private key from key storage 167 and direct the cryptographic engine 121 to decrypt the code (and any associated data, if applicable) using this private key.

In addition, the code (and any related data) also may have been digitally signed using the code provider's private key, guaranteeing the authenticity of the code. To enable validation of the digital signature and the signed code, a digital certificate capable of authenticating the code provider may be provided with the code. For example, the code provider may have a private key and a corresponding digital certificate which has been signed by a "root certificate" of a certificate authority. In such an implementation, the root certificate previously may have been stored in the certificate storage 166. In some embodiments, instead of a single certificate, whole "certificate chains" may be included with the code. In other embodiments, alternative ways of obtaining intermediate certificates (for example, issuing a request to a server (not shown) via the operating system OS 111 and communications port 118) may be used.

At step 220, the supervisor 160 may instruct the cryptographic engine 121 to validate the digital signature of the code provider. This validation of the digital signature will usually include validation of the certificate received with the code. For example, if the code provider's certificate were signed by a certificate authority such as VeriSign®, the supervisor 160 may take a copy of the appropriate VeriSign root certificate from the certificate storage 166 and verify that this root certificate was used to sign the code provider's certificate, performing a typical public key infrastructure (PKI) signature validation; in some cases, a more elaborate validation (for example, including "certificate chains") may be implemented.

In some embodiments, other signature validation schemas (for example, those used in the simple public key infrastructure (SPKI)/simple distributed security infrastructure (SDSI) or the "web of trust" used in pretty good privacy (PGP)) may be used.

In some embodiments, the supervisor 160 may additionally perform certificate revocation list (CRL) validation to ensure that all certificates involved in the signature validation are still valid. A CRL can be obtained, for example, by means of a request to a server which hosts CRLs. This request can be made, for example, via the operating system 111 and the communications port 118 of the non-secure zone 152.

In some embodiments, the Online Certificate Status Protocol (OCSP) may be used to check certificate validity (instead of or in addition to CRL validation).

In certain embodiments, the code provider's digital certificate may differ slightly from a traditional certificate, such that it contains not only a text entry capable of identifying the certificate owner (usually the "CN" field of an X.509 digital certificate), indicating the name of the code provider associated with the certificate, but may further contain an image (for example, PNG or JPEG) with a visual representation of the identity of the code provider. This image may be a part of the digital certificate in the sense that it may be covered by the signature of the certificate issuer in the same way that the other fields of the certificate should be covered; for example, in an X.509 certificate such an "identity image" may be included as an extension in the "Extensions" field. As will be described in further detail below, in some embodiments, it may also be desirable to show this "identity image" on a predesignated portion of the screen 123 while the code is executed.

At step 225, the supervisor 160 may take control of one or more peripherals of the computing device 120 that it needs in order to execute the received code. For example, the supervisor 160 may take control of the keyboard 192 and the screen 123 of the device 120. In such a case, the supervisor 160 may instruct the keyboard switch 194 to effectively disconnect the keyboard 192 from the non-secure components (such as the operating system 111) and to route all keyboard input to the secure zone 150. The supervisor 160 may also instruct the mixer 181 to combine output from image processor 171 and decoder 122 to form image on screen 123, effectively disconnecting the non-secure zone from the screen 123.

In some embodiments, at step 230, it may be determined whether the task should run in partial-screen mode. If it is determined that the task should run in partial-screen secure mode, it may be desirable to provide one or more affirmative confirmations to the user that the device 120 is now operating in the partial-screen secure mode. Thus, at step 235, the supervisor 160 may provide the "identity image" from the code provider's certificate (which certificate has been validated in step 220) to the image processor 171, and may instruct the mixer 181 to show information from the image processor 171 on a designated area of the screen 123. At step 240, the supervisor 160 may turn on the indicator 193.

In such embodiments, the user may confirm that the task is running in the secure zone 150 by checking that the indicator 193 is on, and may confirm that the task was received from a legitimate code provider by verifying that the information displayed in the designated area of the screen 123 (e.g., the code provider's certificate identity image) corresponds to the user's expectations for this task.

If, for example, the information displayed on the screen 123 does not match the user's expectations—e.g., the code provider's name is incorrect, or the wrong identity image is displayed—the user may take an appropriate action to halt the task. For example, the user could press a special key combination on the keyboard 192 to instruct the supervisor 160 to terminate the secure session. Alternatively, if the information displayed on the screen 123 does match the user's expectations but the indicator 193 is off (which may happen, for example, if the operating system 111 is compromised and an attacker controlling the operating system 111 simulates screen output without relegating control to the secure zone 150), the user may similarly take any appropriate action to halt the task. Thus, in order for the user to be assured he is working in a completely secure environment, both (i) the identity image should be displayed in the designated area of screen 123 and (ii) the indicator 193 should be on.

In certain embodiments, the code provider may decide that the task does not require provision of a fully secure environment to the user, but rather requires access to the full area of the screen 123 (i.e., "full-screen secure mode"). This may be implemented, for example, by setting a boolean flag, indicating whether to use full-screen or partial-screen (i.e., displaying the identity image) mode; to ensure security, supervisor 160 may ensure that indicator 193 is on only in partial-screen secure mode (i.e., when the identity image is displayed) If, at step 230, it is determined that the task should run in full-screen secure mode, the supervisor 160 may grant the secure processor 162 access to the whole screen 123 and proceed to step 245. Full-screen mode might be useful, for example, if the user simply wishes to decrypt and display protected media content he already possesses—the secure zone 150 provides useful technical capabilities (such as the crypto engine 121 and decoder 122)—but does not require the fully secure environment that he might use in situations such as secure communications.

At step 245, the supervisor 160 may load the received code into the instruction memory 164, may store any received application data into the data memory 165, and may instruct the secure processor 162 to begin executing the received code.

At step 250, the supervisor 160 may begin waiting for one or more events related to code execution. For example, at transition 252, code running on the secure processor 162 may request the supervisor 160 to switch into full-screen secure mode and obtain access to the whole screen 123 (i.e., without having the "identity image" being shown). In such a case, as described above, at step 254, the supervisor 160 may turn off the indicator 193 to demonstrate that supervisor 160 no longer controls the output to the screen 123 (and therefore that a designated portion of the screen cannot be used to identify the code provider). The supervisor 160 also may instruct the mixer 181 to show only information from the decoder 122 on the screen 123, effectively granting the whole screen 123 to the code running on the secure processor 162.

At transition 255, code running on the secure processor 162 may request the supervisor 160 to switch back into a partial-screen secure mode and redisplay the identity image of the task provider. This may happen, for instance, if a user wished to confirm that the code of the same provider is still running. In this case, at step 256, the supervisor 160 may instruct the mixer 181 to show information from the decoder 122 only on the designated portion of screen 123, while on the other portion the supervisor 160 will begin redisplaying the identity image. The supervisor 160 also may turn on the indicator 193 to assure the user that the displayed is a legitimate identity image.

If, at transition 257, the code execution has finished, the code running on the secure processor 162 may send a notification back to the supervisor 160 notifying it that code execution has finished, and the supervisor 160 may perform certain steps to transition control back to the non-secure zone 152.

In some embodiments it may happen that, as shown at transition 260, code running on the secure processor 162 terminates abnormally (for example, via a secure processor 162 exception).

In this case, at step 270, the supervisor 160 may display a notification message to the user indicating that a secure task has been abnormally terminated and that the system is about to switch to non-secure mode of operation. The method may wait at step 270 until the user confirms that she has viewed this notification message (for example, by pressing a button on the keyboard). This confirmation may be desirable because, otherwise, the user may have the erroneous perception that the secure task is still running after it has actually abnormally terminated. In some embodiments, this notification message may be shown only if the task has changed its mode from partial-screen mode to full-screen mode at least once during task execution time.

At step 275, the supervisor 160 may begin a "cleanup" routine and clear all the instruction and data memories 164 and 165 (for example, by zeroing them). At step 280, the supervisor 160 may shut off the indicator 193. Finally, at step 285, the supervisor 160 may transfer control of any I/O devices back to the non-secure zone 152; for example, it might instruct the keyboard switch 194 to process keyboard 192 input through the operating system 111 of the computing device 120, as well as to instruct the mixer 181 to display information which comes from the operating system 111, on screen 123.

In certain embodiments it may be desirable for a task to include more than one piece of code. This may allow for secure processing in substantially more complicated environments, such as in the case of secure credit card processing.

Figure 3A:
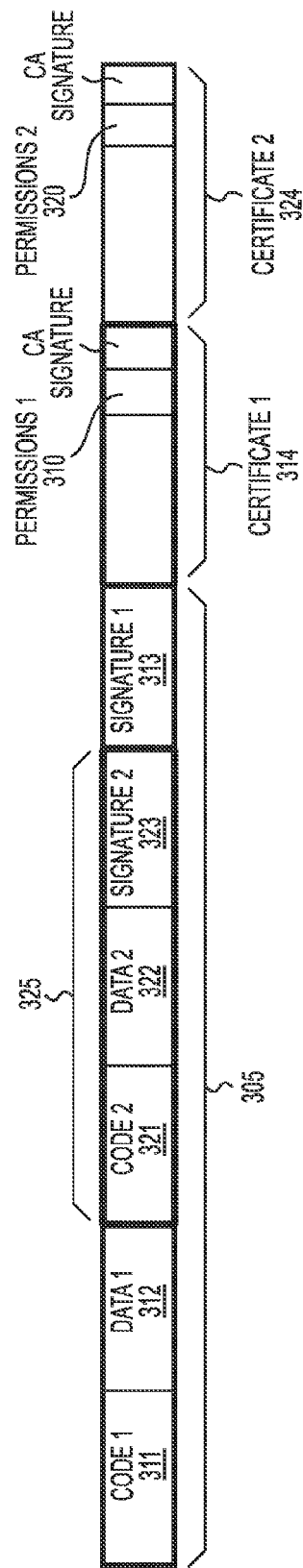
FIG. 3A depicts an exemplary data structure incorporating two separate pieces of code in an embedded relationship.

FIG. 3A illustrates one exemplary data structure for implementing tasks with two pieces of executable code (and data associated with each piece of executable code). As shown on FIG. 3A, a "subtask" 325 may be formed by code2 321, data2 322, and an associated digital signature2 323. The task 305 may be formed by code1 311 and data1 312 together with the subtask 325, all of which may be encompassed by signature1 313.

It is to be understood, however, that a task 305 may contain more than one subtask 325 (with each subtask potentially having its own set of digital certificates and permissions). This may be used, for example, such that the task may switch execution to one of its subtasks, wait for the subtask's termination and then switch to another subtask. It is further possible that one or more of the subtasks may contain further sub-subtask and so forth.

Both the task 305 and the subtask 325 may have certain permissions, which describe the access their respective code may have to various portions of the secure zone 150 and/or any peripheral devices (such as, the keyboard 192 and/or the screen 123). For example, code2 321 (within subtask 325) may be permitted to access portions of the secure zone 150 as described in Permissions2 320, while the permissions1 310 may describe which portions of the secure zone 150 may be accessed by code1 311. These permissions may be stored within digital certificates signed by, for example, one or more certificate authorities. As shown on FIG. 3A, a first digital certificate 314 may contain permissions1 310, while a second digital certificate 324 may contain permissions2 320. These permissions may be implemented, for instance, within the "Extended Key Usage" field in an X.509 certificate. In some embodiments, certificates may not be included in the task, but may be obtained separately without affecting security.

In some embodiments, it may be desirable for a code developer to be able to assign permissions to the code she develops. For example, for additional security, the code developer may wish to reduce the permissions associated with a particular task or subtask. In these embodiments, another set of permissions may be included within the task (or the subtask, as applicable). To the extent any such secondary permissions are included within a task or subtask, however, it may be desirable to have the supervisor 160 interpret these permissions in view of any existing permissions already signed by a certificate authority. For example, if the code developer wants to add an additional set of permissions to code1 311, then these additional permissions may only modify permissions1 310. It may further be desirable to require that any such secondary permissions cannot exceed their respective underlying permissions. For example, in the case of code1 311, the additional permissions may not be permitted to enlarge the scope of permissions1 310 as provided by the certificate authority.

When the supervisor 160 receives a task (such as the task 305 containing the subtask 325 as shown in FIG. 3A), the supervisor 160 may load code1 311 and data1 312 into instruction memory 164 and data memory 165, as appropriate, for subsequent execution (e.g., as described in greater detail above with respect to FIG. 2 at step 245). During the execution of the code1, the supervisor 160 may enforce restrictions specified in permissions1 310. Upon receipt of the task, the supervisor 160 may also store permissions2 320, code2 321, and data2 322 somewhere within the secure zone 150 (for example, code2 321 may be stored in instruction memory 164 and data2 322 may be stored in data memory 165—potentially in encrypted form to prevent misuse). At this point, however, neither the code2 (nor its associated permissions2 320 or data2 322) takes any active part in the execution of code1.

As described in greater detail previously, with respect to FIG. 2, at step 250, the supervisor 160 waits for one or more task-related events. Such events may include certain types of requests from the currently-running code to the supervisor 160. In embodiments supporting complex tasks, for example, as described with respect to FIG. 3A, the supervisor 160 may support requests from currently-running code to execute one or more subtasks. For example, the supervisor 160 may support a request from code1 311 to execute code2 321. Such a request may contain, for example, the start and end of a region within the data memory 165 which code2 321 may be allowed to use for its own purposes, and the start and end of an area within the data memory 165 which will be accessible for both code1 311 and code2 321 for the purpose of exchanging data between code1 311 and code2 321.

Figure 3B:
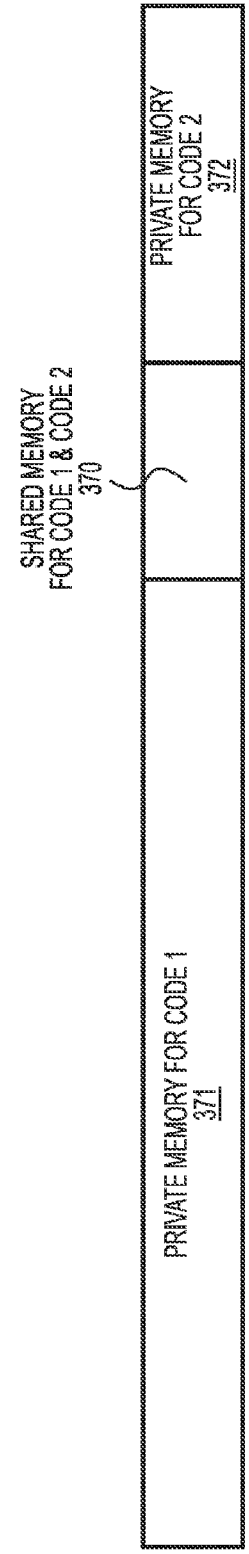
FIG. 3B is one exemplary implementation of a logical partition of the data memory within the secure zone.

FIG. 3B is one exemplary logical division of data memory 165 into three areas, which can be used by two pieces of code, code1 311 and code2 321. It will be understood, however, that the relative location and size of the three areas is merely exemplary and can depend on many factors, including the preferences of the developers of code1 and any guidelines for adding a subtask 325 to a task 305 (which may be created, for instance, by the developers of subtask 325). As shown on FIG. 3B, data memory block 371 is "private" for code1; data memory block 372 is "private" for code2; and data block 370 is a shared area which may be accessible to both code1 and code2. For example, if the shared data block 370 is used, code1 may store some data within the shared memory area 370 that may be accessed by code2 when code1 is suspended and code2 is loaded for execution. Similarly, code2 may store data within the shared memory area 370 that may be accessed by code1 when code2 is terminated and code1 is resumed.

Figure 4:
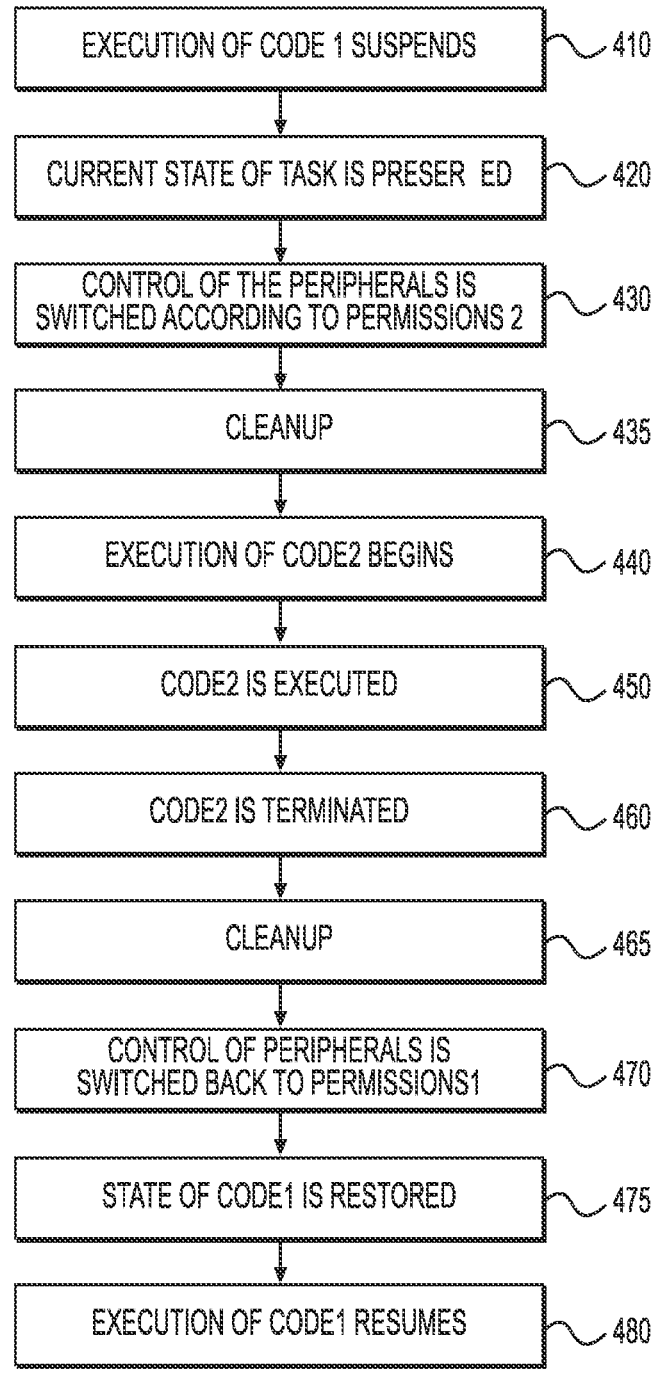
FIG. 4 is a flow diagram of an exemplary method by which the secure zone may switch tasks.

FIG. 4 illustrates one exemplary method by which the supervisor 160 may handle a request from a task 305 currently running on the secure processor 162 to call a subtask 325.

At step 410, the supervisor 160 may instruct the secure processor 162 to suspend execution of code1 311. At step 420, the supervisor 160 may store the current state of the task 305. For example, the supervisor 160 may store the current state of code1 311. In certain embodiments, this might call for the supervisor 160 to store a current value of a program counter register and/or any other registers of the secure processor 162 within temporary storage 170 of the supervisor 160. The supervisor 160 also may preserve the current state of any data memory 165 associated with code1 311. This may include, for example, instructing the secure processor 162 (and/or the data memory 165) to restrict access of the code running on secure processor 162 (i.e., code 1 311) to the data memory areas 370 and 371. In addition to, or instead of, such restriction, the supervisor 160 may encrypt the data memory area 371, and/or calculate a secure hash (such as SHA-256) of the data memory area 371 and store the value of this hash within the temporary storage 170 of the supervisor 160. The supervisor 160 further may store the current state of any peripherals (such as the screen 123, and/or the keyboard 192). For example, the supervisor 160 may read the current state of any LEDs on the keyboard 192 and store them within the temporary storage 170.

Similarly, the supervisor 160 may read the state of screen 123 and store it (for example, as an array of pixels) within the temporary storage 170.

At step 430, the supervisor 160 may switch control of any peripherals according to the Permissions2 320 of the subtask 325. For example, in certain embodiments, the permissions1 310 of task 305 may allow the code1 311 to access certain peripherals (such as the keyboard 192) but permissions2 320 of subtask 325 may prohibit code2 321 from accessing some of peripherals allowed in permissions1 310. In addition, the screen 123 also may be cleared at this step 430.

At step 435, the supervisor 160 may execute a cleanup routine to ensure that the subtask code2 321 which is about to run is not affected by any data left in the data memory 165 by the execution of code1 311. For example, the supervisor 160 may zero data memory area 372.

At step 440, the supervisor 160 may instruct the secure processor 162 to begin executing code2 321. For example, the supervisor 160 may direct the secure processor 162 to start execution at a predefined point within code2. Alternatively, the starting point of code2 may be included in the task 305. The supervisor 160 may also provide a reference to the secure processor 162 allowing it to locate and access data memory areas 370 and 372 intended for use by code2 321. For example, in certain embodiments, the supervisor 160 may pass a pointer to the secure processor 162 referencing these memory locations via one or more registers located within the supervisor 160.

During the execution of code2 321 (as shown at step 450), the supervisor 160 may enforce any permissions2 320 associated with the code2 321. For example, if at step 450, the supervisor 160 receives a request from code2 321 for full-screen control (e.g., corresponding to step 252, as shown on FIG. 2), the supervisor 160 may verify whether the permissions2 320 allow the code2 321 to assume such full-screen control and proceed with step 252 only if those permissions2 320 permit full-screen control.

At step 460, code2 321 may have terminated its execution, i.e., the subtask 325 may be completed. At step 465, the supervisor 160 may perform one or more cleanup activities in preparation for transitioning back to the execution of code1; for example, the supervisor 160 may zero the memory area 372. At step 470, the supervisor 160 may switch the control of any peripherals (such as screen 123 and/or keyboard 192) back to the state they were in before execution of code2 started (or in accordance with the permissions1 310, if the peripherals' state was not stored at the time the subtask 325 began).

At step 475, the supervisor 160 may restore the state of the task 305, which was stored at step 420. For example, the supervisor 160 may restore the state of code1, such that it begins executing where it left off at the time the subtask 325 was called. This may be accomplished by, for example, updating a program counter and/or any other registers of the secure processor 162 to the values stored in temporary storage 170, for example, during step 420. If the memory area 371 was encrypted at step 420, the supervisor 160 may ensure that it is decrypted. If a secure hash was calculated at step 420, the hash may be recalculated and compared to the original hash value. If the hash calculated at this step 475 does not match the hash value stored at step 420, it may be deduced that code2 has managed to violate the integrity of code1's data memory block 371, and the execution of code1 should not be resumed (possibly with an appropriate message to the user). Additionally, if at step 420, the secure processor 162 and/or the data memory 165 were instructed to restrict access only to data blocks 370 and 372, at this step 475 the supervisor 160 may lift this restriction, and code1 311 (and the secure processor 162) may receive access to the entire data memory 165. Finally, the state of any peripherals (such as the keyboard 192) stored, for example, in step 420, may be restored. If the state of the screen 123 was stored, the state of screen 123 may be restored to the stored value; otherwise, the screen 123 may be blanked.

At step 480, the supervisor 160 may instruct the secure processor 162 to resume the execution of code1 311.

The embodiments described thus far have detailed three modes of operation of the device 120: "non-secure mode," "full-screen secure mode," and "partial-screen secure mode." To indicate that the device 120 is operating in "partial-screen secure mode," as described above, the indicator 193 may be turned on. In another embodiment according to the present disclosure, the device 120 may run in a fourth "super-secure" or "extra-secure" mode of operation, as will be described in further detail below. In such an embodiment, the indicator 193 may have another "super-secure" state (in addition to the "off" and "on" states described above); this super-secure state of the indicator 193 may indicate that device 120 is currently operating in super-secure mode. In such an embodiment, for example, the indicator 193 may be implemented as two separate LEDs (each readily visible to the user). If one LED is on, it may indicate that the device 120 is operating in the partial-screen secure mode (described in greater detail previously); if two LEDs are on, the device 120 may be operating in a super-secure or extra-secure mode. Whether any piece of code (such as code1 311 or code2 321) is allowed to switch to super-secure mode may be specified within its respective permissions fields (e.g., permissions1 310 or permissions2 320 respectively).

Figure 5:
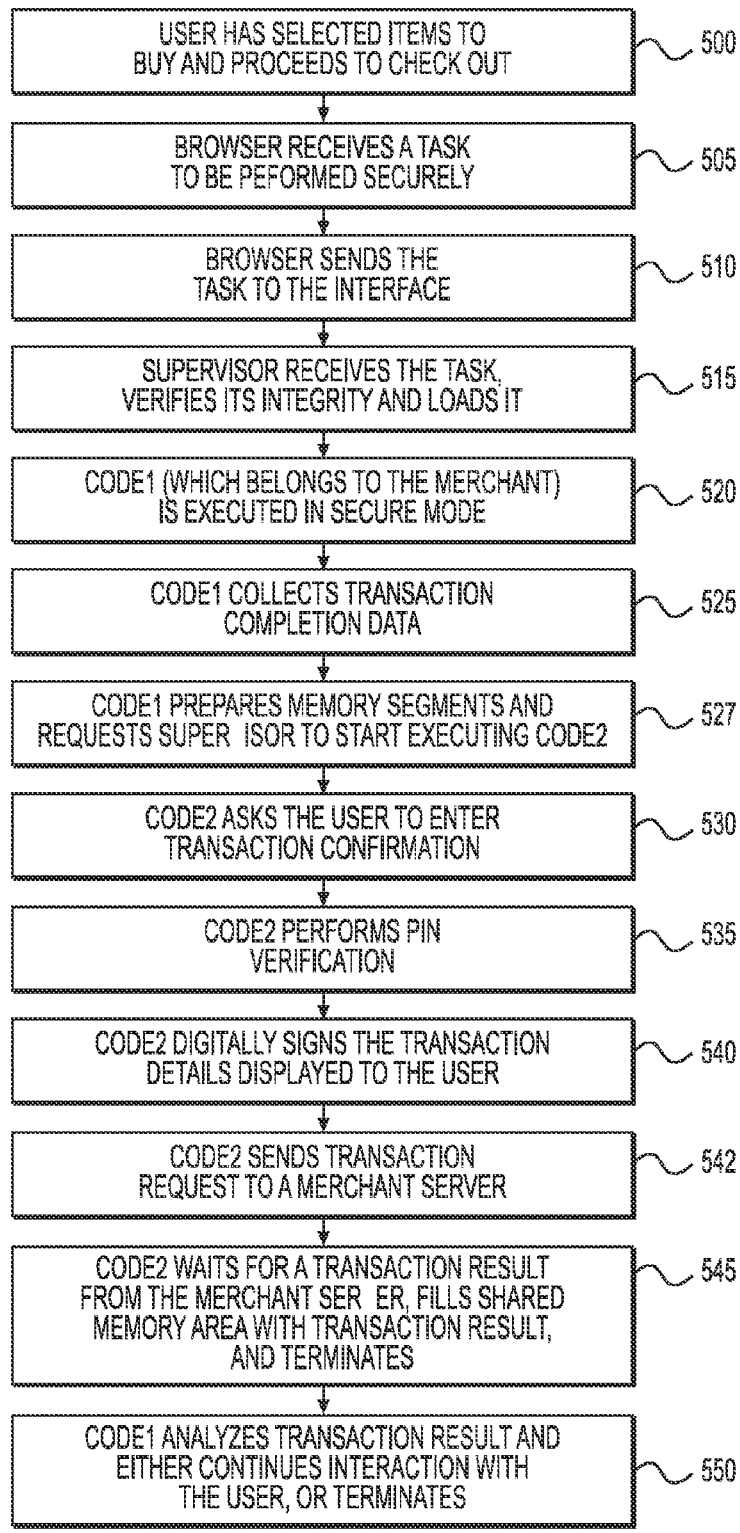
FIG. 5 is a flow diagram of an exemplary method by which a secure credit card transaction may be performed within the context of the present disclosure.

FIG. 5 is an exemplary embodiment demonstrating how a particular task, a secure credit card transaction, may be performed within the present disclosure. In addition to its applicability to the present disclosure, the method shown on FIG. 5 may be used to implement the functionality described in U.S. Provisional Patent Application No. 61/623,702, filed on Apr. 13, 2012, titled "Apparatuses, Methods And Systems For Computer-Based Secure Transactions," and naming Sergey Ignatchenko and Dmytro Ivanchykhin as inventors.

At step 500, a user may browse the Internet using a web browser (running as an application 112 under operating system 111) on her computer 120. Using his browser, the user may visit an E-commerce site of the merchant, select some items to buy, and proceed to check out by selecting a correspondent web link.

At step 505, the user's browser may make a request to the server defined in the web link, receive the response, and determine that the received data is a task to be performed in a secure mode. The browser may determine this, for example, by a special form of the URL in the web link, or by the structure of the received data.

At step 510, the web browser may send the task to the interface 151 of a secure zone 150 running on the user's computing device 120. This may be performed, for example, by a call to the operating system 111, which in turn may pass the information to the interface 151.

The task sent to the secure zone 150 may be structured as shown on FIG. 3A, wherein the overall task 305 (i.e., code1 311 and data1 312) may be provided by the merchant (with signature1 313 being the digital signature of the merchant on this code and data), and wherein the subtask 325 (i.e., code2 321 and data2 322) may be provided, for example, by the merchant's bank (usually referred to as the acquiring bank), or any other entity which the merchant's bank trusts, with signature2 323 as the digital signature of the trusted bank/entity.

For the purposes of the present example, it may be assumed that significant control may be exercised over banks or trusted entities, such that the probability that code2 or data2 contains malicious code or data is very low or eliminated. By contrast, it is assumed that merchants are not as secure, and that there is a possibility that code or data provided by a merchant may be malicious. Thus, in this example, it may be assumed that a certificate authority will not issue any certificate1 314 for a (merchant's) task 305 such that the task would have permissions1 310 to run code1 311 in the "super-secure" mode. However, certificate authorities may issue a certificate2 324 with permissions2 320 allowing a (bank's) subtask 325 to enter "super-secure" mode. This approach may be used to ensure that credit card data (including a PIN) cannot be accessed by a malicious merchant, and further may be used to provide a sufficient evidentiary record for future dispute resolution.

At step 515, the supervisor 160 may receive the task 305, verify its integrity and load it into the instruction memory 165 of the secure zone 150 (e.g., in accordance with steps 205-240, as discussed in greater detail with respect to FIG. 2). In particular, the supervisor 160 may display to the user an "identity image" of the certificate1 314, which will give an opportunity to the user to make sure that the task 305 has come from an expected source, i.e., the E-commerce vendor from whom she intends to purchase an item.

At step 520, code1 311 (which belongs to the merchant) can be executed, in a secure mode. This code may be executed with the supervisor 160 displaying the "identity image" of the Certificate1 314 in the designated area of screen 123, and with the indicator 193 in a "secure" state. This code1 311 may implement some (optional) interaction with the user, and/or secure communications with a remote server. For example, the user may be requested to select a product or product options (such as color, size, etc.). This interaction may continue until the user decides to quit (in which case the code1 may terminate), or until the user decides to go ahead with a purchase, specifying all the terms of the purchase (including total amount to be charged, product, delivery address, etc.)

In cases in which code1 initiates a secure connection with a merchant's server, code1 311 may ensure that the operating system 111 cannot eavesdrop or modify the communication. To achieve this, in one embodiment, code1 311 may contain an implementation of an entire TCP/IP stack, and the secure processor 162 may directly access the communications port 118 of the computing device 120. In another embodiment, a TCP/IP stack (optionally including SSL support) may be implemented by the supervisor 160. In yet another embodiment, code1 311 running on the secure processor 162 may use the network transport capabilities (e.g., the TCP/IP stack) of the non-secure operating system 111, so that the operating system 111 is used merely as an intermediary to transmit secure packets or messages (e.g., SSL messages) without the capability to determine and/or alter the content of the secure packets or messages. In the latter case, the secure processor 162 may communicate, through the interface 151, with the non-secure operating system 111. In particular, code 1 311 may send requests to perform TCP/IP operations and then send and receive SSL messages over a TCP/IP connection established on its behalf by operating system 111. In this example, the operating system 111 provides only TCP/IP capabilities, with all SSL cryptography residing within secure zone 150.

At step 525, if all of the terms of the purchase are finalized and the user wants to go ahead with the purchase, code1 311 may collect transaction completion data. This information may include transaction details (which may be in form of textual description or one or more images, which may include, for example, a description of the products involved and/or delivery address), and the transaction amount (which may include transaction currency).

At step 527, code1 311 may designate some area of the data memory 165 to be used as shared memory area 370 and some area for code2 321 to use as its own data memory area 372; store the transaction completion data (e.g., as generated at step 525) in shared memory area 370; and then request the supervisor 160 to start executing code2. The supervisor 160 may then transition control to code2 321, e.g., in accordance with steps 410-450 as described above with respect to FIG. 4.

If permissions2 320 indicate that code 2 321 may run in "super-secure" or "extra-secure" mode, then supervisor 160 may switch the indicator 193 to a "super-secure" state (e.g., by turning on two LED lights of the indicator 193), which indicates to the user that the information that the user may enter will not be accessible to the merchant but only to the bank (or an equivalently trusted entity). Additionally, permissions2 may specify that the supervisor 160 may allow the secure processor 162 access to a credit card reader (not shown).

At step 530, code2 321 may display transaction completion data (collected in step 525 and passed to code2 via shared memory area 370 in step 527), and ask the user (by, for example, displaying instructions on the screen 123) to confirm that user is going to complete the transaction and/or to provide relevant information. For example, the user may be requested to insert a credit card into a card reader (not shown), enter a PIN number using the keyboard, and/or to confirm that she agrees with the specifics of the transaction (e.g., items, amounts, totals, etc.) as it is displayed on the screen 123. Code2 321 may process any available inputs (for example, code2 321 may read the PIN as it is entered on keyboard 192, and read credit card data from credit card reader).

In embodiments in which the user has entered a PIN, at step 535, code2 may perform PIN verification. This PIN verification may be implemented as either "offline PIN" verification (i.e., using the card to validate the PIN), or "online PIN" verification (i.e., issuing a request to the payment network—via the server—to validate the PIN).

At step 540, if the credit card is an ICC and the card reader has ICC reading capabilities, code2 321 may digitally sign the transaction details displayed to the user by ICC (by, for example, using a MAC in a manner similar to which it is used in the EMV protocols, or by using public/private cryptography). The digital signature may encompass the transaction details as they were shown to the user, or alternatively, it may encompass hash values that were calculated for such transaction details. The digital signature may also take into account a PIN if it was used. Even if the PIN is taken into account in calculating the digital signature, it may be desirable to ensure that the PIN itself is not included in the message sent to the merchant so as to avoid revealing the PIN to the merchant.

At step 542, code2 321 may send a transaction request to a merchant server. This request may include transaction completion data (e.g., merchant identity, transaction details and transaction amount) as well as a digital signature if one was calculated (e.g., as in step 540). The transaction request may be sent to the merchant server, for example, over a secure SSL channel. Such an SSL channel may be established either by code2 independently (in a manner similar to that of described in step 520), or the SSL context of the SSL connection established by code1 can be used. In the latter case, in step 527, code1 311 may store the existing SSL context to the shared memory area 370 (wherein the SSL context is a data structure representing the context of the SSL connection), and code2 321 may use this context to continue the existing SSL conversation.

At step 545, code2 321 may wait for a transaction result from the merchant's server. When code2 receives the transaction results from the merchant's server, it may display transaction results to the user, and wait for the user's confirmation that he has seen the transaction results. Then code2 321 may write the results to the shared memory area 370 (for later use by code1 311) and terminate.

In some embodiments, instead of code2 321 performing steps 542 and 545, code2 321 may prepare the transaction request (including the digital signature from step 540 if necessary) and then terminate, leaving the remaining steps of sending the transaction to the server and interpreting the response to code1 311.

After code2 321 terminates, the supervisor 160 may perform any steps necessary to switch back to running code1 311. For example, the supervisor 160 may perform steps similar to those discussed with respect to steps 460-480 of FIG. 4, and may further switch the indicator 193 back to the "secure" state from the "super-secure" state, disconnect the credit card reader from the secure processor 162, and resume execution of code1 311.

At step 550, the code1 may analyze the transaction results that were stored to the shared memory area 370 by code2 and, depending on the results of the analysis, either continue interaction with the user, or terminate.

Figure 6:
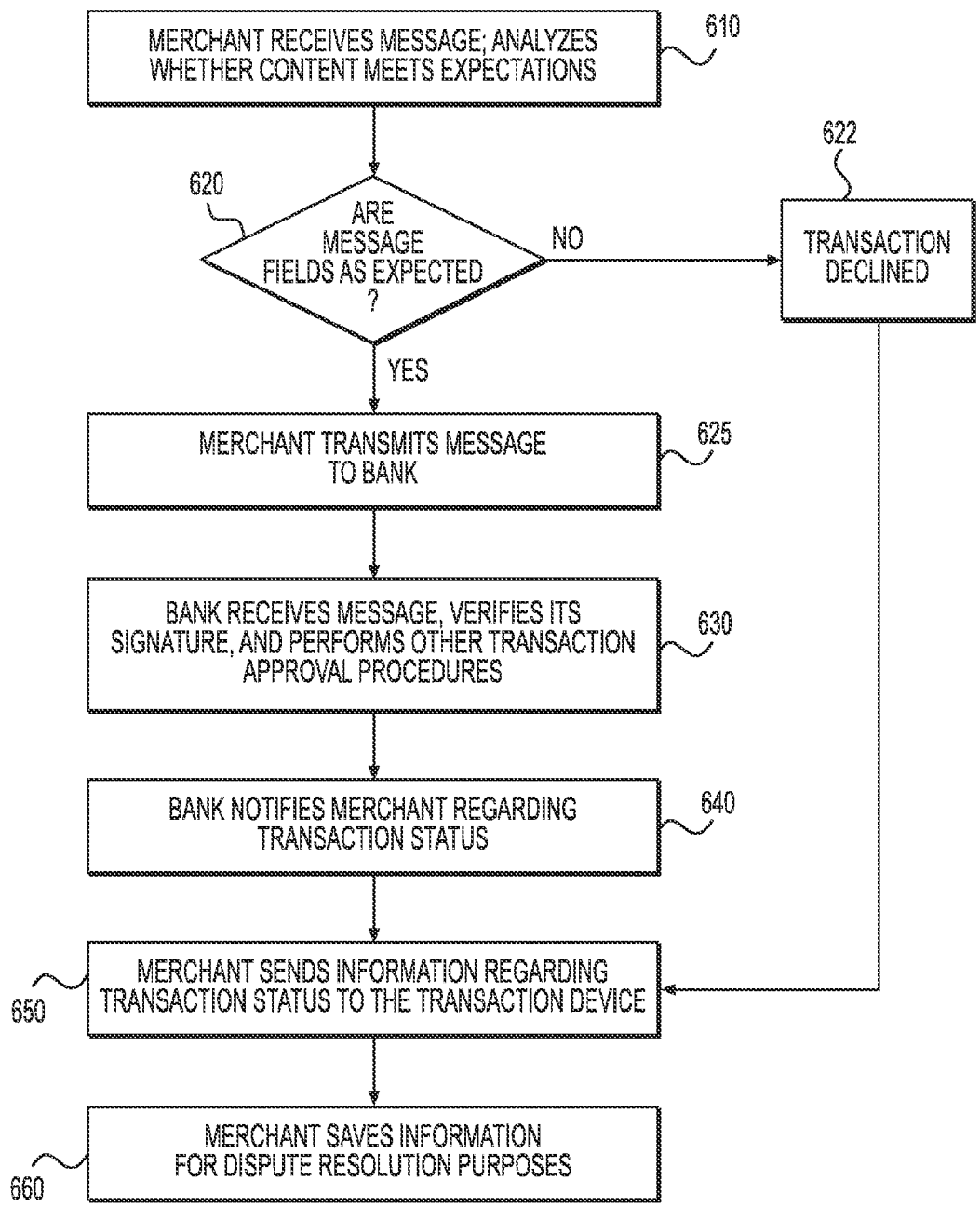
FIG. 6 is a flow diagram of an exemplary method by which a merchant may process a transaction request within the context of the present disclosure.

FIG. 6 is a flow chart illustrating how a merchant may process a transaction request received from a computing device 120. At step 610, the merchant may receive a transaction request (e.g., formed by the computing device at step 542) and may verify that the currency and the amount of the transaction, and the hash of the merchant ID and the transaction details (which, as discussed with respect to step 540, may be the actual transaction details or respective hash values depending on the embodiment) conform with the merchant's expectations of what was displayed to and accepted by the user. If, at step 620, the merchant determines that the received values are not the same as that expected by the merchant, the merchant may elect to decline the transaction at step 622 as potentially based on fraudulent or malicious information, and proceed to step 650. If on the other hand at step 620 the received values are the same as that expected by the merchant, at step 625, the merchant may save a copy of the message for its own records and for possible future dispute resolution purposes and transmit the message to the bank for further transaction processing.

It is to be understood that while the merchant may be able to verify whether the received transaction details conform to the merchant's expectations, the merchant may not have access to the user's sensitive information (such as, for example, the user's credit card number, PIN, or other information that is intended to be received by the bank and not the merchant). Similarly, the merchant may not be able to verify the signature of the message as signed by code2 whereas the bank may have that ability.

At step 630, the bank may receive the message, verify its signature, and performs other approval procedures (for example, verifying whether the user has sufficient funds to perform the transaction). In particular, if signature verification fails, the bank may decline the transaction as based on inconsistent information.

At step 640, the bank informs the merchant whether the transaction has been approved or denied. At step 650 the merchant may forward information regarding the transaction status (e.g., whether accepted or declined, estimated delivery date, etc.) to the to the computer 120. Additionally, at step 660, the merchant may store the confirmation from the bank and the information sent to the user for its own records and possible future dispute resolution purposes.

Separately, if the transaction has been accepted, the merchant may proceed at an appropriate time to ship or deliver the purchased goods to the user.

It is to be recognized that even if the merchant may not be able to verify the signature (which is the case if MAC-like signatures are used), transaction security and integrity is maintained by the fact that the bank has the ability to check the signature. Thus, even if the transaction data communicated by the device 120 to the merchant matches the merchant's expectation, the transaction may still be rejected by the bank if the bank cannot verify the signature. Accordingly, a transaction is approved after both the transaction data and the signature have been appropriately verified.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
a secure zone comprising an interface to a non-secure zone, the secure zone further configured to:
execute a task having one or more subtasks, wherein the task and the subtasks have respective executable code for one more secure transactions, the task and the subtasks are digitally signed by respective code providers, and execution is switched between the task and the subtasks; and
apply respective sets of permissions describing access to certain portions of the secure zone while the respective executable code of the task and subtasks are executed, wherein the respective set of permissions for the task are based on at least one of information associated with the signed task and information in a digital certificate of the respective code provider for the task, and wherein the respective set of permissions for the subtasks are based on at least one of information associated with the signed subtasks and information in a digital certificate of the respective code provider for the subtasks.

2. The apparatus of claim 1, wherein the respective sets of permissions are contained inside respective digital certificates signed by respective certificate authorities.

3. The apparatus of claim 1, wherein at least one of the task and subtask has a set of secondary permissions signed by a respective code developer.

4. The apparatus of claim 3, wherein the secondary permissions are narrower than underlying permissions signed by a respective certificate authority.

5. The apparatus of claim 1, wherein the secure zone is tamper-resistant.

6. The apparatus of claim 1, further comprising a peripheral device and a non-secure zone, wherein the secure zone is configured to assume control of the peripheral device in a secure mode and the non-secure zone is configured to receive control of the peripheral device transferred from the secure zone in a non-secure mode, and wherein the respective sets of permissions of the task and subtask prescribe separate access rights to the peripheral device for the respective executable code.

7. The apparatus of claim 6, further comprising a switching device for the peripheral device, wherein the peripheral device is an input device and the switching device is configured to switch input received by the input device to the secure zone in the secure mode and to the non-secure zone in the non-secure mode.

8. The apparatus of claim 6, further comprising a mixing device coupled to the peripheral device, wherein the peripheral device is a screen and the mixing device is configured to mix outputs from the secure zone and the non-secure zone to generate a display output to the screen.

9. The apparatus of claim 8, wherein the display output includes an identity image for the respective code provider that signed the task.

10. The apparatus of claim 8, wherein the mixing device is configured to exclude any output from the non-secure zone in the display output.

11. The apparatus of claim 1, further comprising a first indicator to be activated when the task is being executed by the secure zone.

12. The apparatus of claim 11, further comprising a second indicator wherein the first and second indicators are configured to be both activated when the subtask is being executed by the secure zone.

13. The apparatus of claim 1, further comprising a non-secure zone, wherein the secure zone is configured to use network capabilities of the non-secure zone to connect to a network.

14. The apparatus of claim 1, wherein the secure zone comprises a secure processor to execute the task and subtask, the secure processor comprises a temporary storage configured to store a current state of a data memory area used by the task when switching to execute the subtask.

15. The apparatus of claim 14, wherein the temporary storage is further configured to store a secure hash of the data memory area used by the task when switching to execute the subtask.

16. The apparatus of claim 14, wherein the temporary storage is further configured to store a current state of any peripheral devices used by the task when switching to execute the subtask.

17. The apparatus of claim 1, wherein the secure zone comprise a memory for code execution and the secure zone is configured to:
load and execute the executable code of the task;
suspend the execution of the executable code of the task;
preserve a state of the task;
grant access rights to peripheral devices of the apparatus according to the set of permissions of the subtask; and
execute the subtask.

18. A method, comprising:
executing, within a secure zone comprising an interface to a non-secure zone, a task having one or more subtasks, wherein the task and the subtasks have respective executable code for one more secure transactions, the task and the subtasks are digitally signed by respective code providers, and execution is switched between the task and the subtasks; and
applying respective sets of permissions describing access to certain portions of the secure zone while the respective executable code of the task and subtasks are executed, wherein the respective set of permissions for the task are based on at least one of information associated with the signed task and information in a digital certificate of the respective code provider for the task, and wherein the respective set of permissions for the subtasks are based on at least one of information associated with the signed subtasks and information in a digital certificate of the respective code provider for the subtasks.

19. The method of claim 18, wherein the respective sets of permissions are contained inside respective digital certificates signed by respective certificate authorities.

20. The method of claim 18, further comprising storing a secure hash of a data memory area used by the task when switching to execute the subtask.

21. The method of claim 18, further comprising storing a current state of any peripheral devices used by the task when switching to execute the subtask.

* * * * *